(No Model.)
F. S. SOMES.
BEARING LUBRICATOR.
No. 386,274.             Patented July 17, 1888.
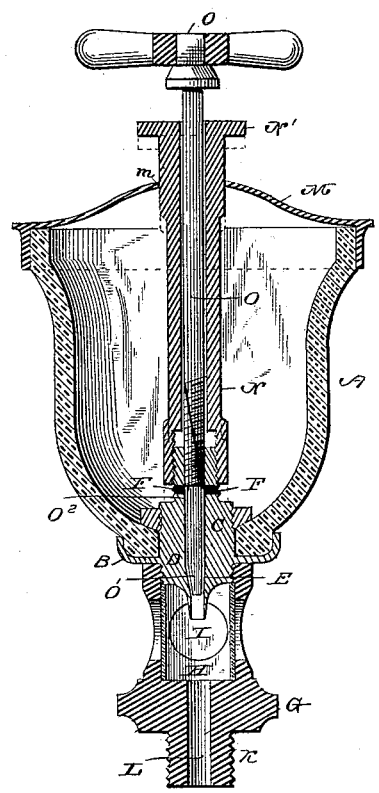
WITNESSES,
INVENTOR,
Frank S. Somes.
By C. A. Snow & Co.
Attorneys.

UNITED STATES PATENT OFFICE.

FRANK STANWOOD SOMES, OF LAWRENCE, ASSIGNOR TO DUDLEY M. HOLMAN, OF BOSTON, MASSACHUSETTS.

BEARING-LUBRICATOR.

SPECIFICATION forming part of Letters Patent No. 386,274, dated July 17, 1888.

Application filed September 16, 1885. Renewed October 6, 1887. Serial No. 251,662. (No model.)

*To all whom it may concern:*

Be it known that I, FRANK STANWOOD SOMES, a citizen of the United States, residing at Lawrence, in the county of Essex and State of Massachusetts, have invented a new and useful Improvement in Bearing-Lubricators, of which the following is a specification, reference being had to the accompanying drawing.

My invention relates to an improvement in bearing-lubricators; and it consists in the peculiar construction and combination of devices, that will be more fully set forth hereinafter, and particularly pointed out in the claims.

The accompanying drawing is a vertical sectional view of a lubricator embodying my invention.

A represents an oil-cup, that is preferably made of glass to permit its contents to be readily inspected. The bottom of this cup is formed by a metallic seat, B, provided with a central vertically-extending tube, C, communicating with a discharge-nozzle, D, at its lower end, the bore of which is tapered, as at E. Inlet-openings F are made in the tube C at the bottom of the oil-cup, and said tube is both interiorly and exteriorly screw-threaded, as shown. The lower side of the metallic seat is screwed into the upper end of a supporting-base, G, having a chamber, H, lined with glass, the sides of which chamber are provided with openings I, and from the lower side of the chamber depends a screw-plug, K, for the attachment of the device to a bearing to be lubricated. A central bore or opening, L, is made through the plug directly below the discharge-nozzle D.

M represents a cap or cover that fits over the oil-cup, and has a central opening, $m$. A hollow cut-off sleeve, N, passes down through this opening, and is interiorly screw-threaded at its lower end and screws onto the exterior of the tube C, and is adapted to close or open the openings F. The upper end of the sleeve is provided with a milled head, N', by means of which the sleeve may be readily grasped and turned in either direction to cut off or start the flow of oil from the cup.

O represents a valve-spindle that passes down through the bore of the sleeve N, and is of less diameter than said bore, leaving an air-space around the spindle. Near its lower end the spindle is screw-threaded and screws into the tube C, and at its lower end the said spindle is tapered to form a valve, O', adapted to regulate the flow of oil through the tapered bore of the discharge-nozzle.

Spiral grooves $O^2$ are cut in the lower threaded portion of the shank to form air-channels communicating with the interior of the valve-seat in the discharge-nozzle to permit the flow of oil therethrough. The upper end of the regulating-valve is provided with a head, $O^3$, to which a suitable wrench or handle is applied to turn the spindle and regulate the flow of oil through the nozzle by turning said spindle and raising or lowering the tapered valve in its seat, as will be very readily understood.

The openings I in the chamber below the discharge-nozzle enable the quantity of oil fed to the bearing to be noted.

When the machinery stops, the sleeve N is turned to close the openings F and prevent waste of oil, and when the machinery is in motion the quantity of oil fed to the bearing can be readily regulated by turning the spindle, as before described.

Having thus described my invention, I claim—

1. The combination, in a lubricator, of the cup having the discharge-nozzle, the cut-off sleeve for opening and closing the openings leading to the nozzle, and the regulating-valve for controlling the quantity of oil fed from the cup, substantially as described.

2. The combination, in a lubricator, of the cup, the tube C, having the openings F, and the discharge-nozzle forming a tapered valve-seat, with the cut-off sleeve N, for opening and closing the openings F, and the tapered valve O' in the valve-seat, to regulate the quantity of oil fed from the cup, substantially as described.

3. The combination, in a lubricator, of the cup, the tube C, having the openings F, and the discharge-nozzle forming a tapered valve-seat, with the cut-off sleeve N, and the tapered valve O', having the stem extending through the sleeve, and air-passages to permit the flow of oil through the discharge-nozzle, substantially as described.

4. The combination of the oil-cup, the tube C, interiorly and exteriorly screw-threaded and having the openings F, and the discharge-nozzle forming a tapered seat, with the cut off sleeve N, screwed on the outside of the tube, and the tapered valve O', having the stem O, of less diameter than the bore of the sleeve and extending therethrough, and having the screw-thread at its lower end working in the tube C, and the air-passages $O^2$, for the purpose set forth, substantially as described.

In testimony that I claim the foregoing as my own I have hereto affixed my signature in presence of two witnesses.

FRANK STANWOOD SOMES.

Witnesses:
W. H. KNOWLES,
JOHN T. WHATMOUGH.